No. 701,615. Patented June 3, 1902.
F. REICHENBACH.
FLEXIBLE DEVICE FOR CONNECTING STATIONARY OR MOVABLE MACHINE PARTS.
(Application filed Nov. 17, 1900.)
(No Model.)
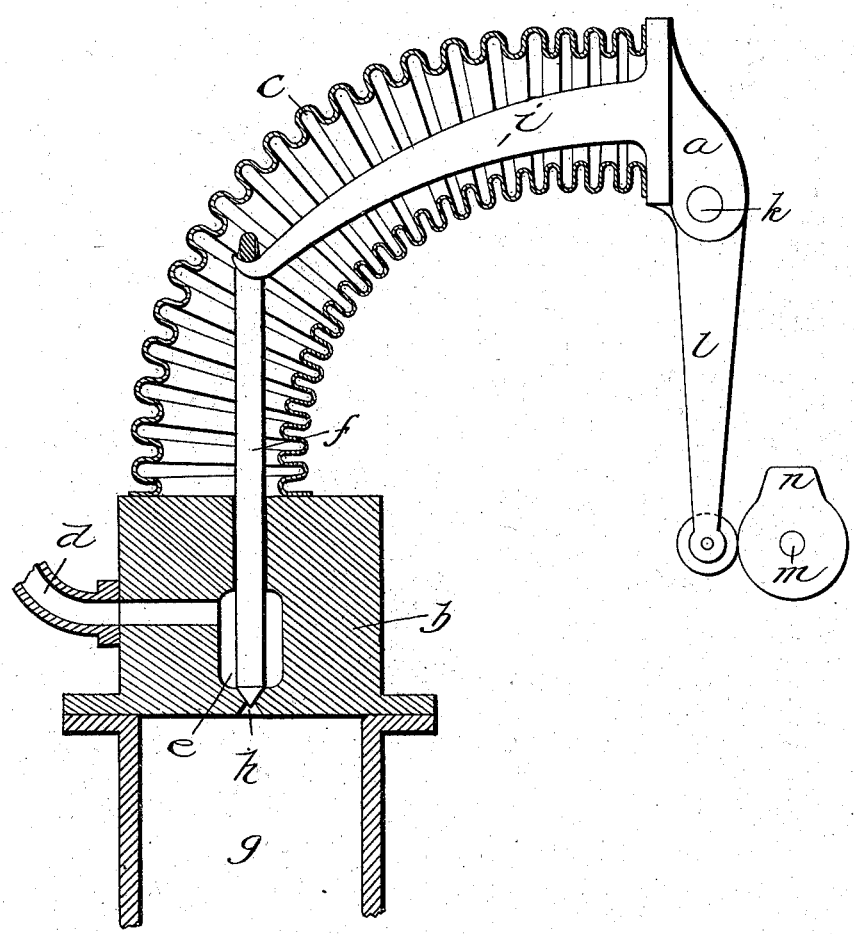

UNITED STATES PATENT OFFICE.

FRITZ REICHENBACH, OF BERLIN, GERMANY.

FLEXIBLE DEVICE FOR CONNECTING STATIONARY OR MOVABLE MACHINE PARTS.

SPECIFICATION forming part of Letters Patent No. 701,615, dated June 3, 1902.

Application filed November 17, 1900. Serial No. 36,904. (No model.)

*To all whom it may concern:*

Be it known that I, FRITZ REICHENBACH, engineer, a subject of the King of Prussia, German Emperor, residing at Berlin, in the Kingdom of Prussia, German Empire, have invented a new and useful Flexible Device for Connecting Stationary or Movable Machine Parts, of which the following is a specification.

The subject of the present invention is a flexible tube, which is employed as a substitute for a stuffing-box, for the purpose of connecting stationary and movable machine parts.

In order to make my invention more clear, I refer to the accompanying drawing, in which I have represented a side view of one form of construction of my improved device, partly in section.

The particular machinery to which it is here shown applied consists of a stationary head $b$, bolted to a pipe $g$ and having a chamber $e$, into which gas passes through an inlet $d$ on its way to the pipe $g$. The inlet-opening $h$ into the pipe is opened intermittently by a piston $f$, attached to the one arm $i$ of a double-armed lever $a$, pivoted at $k$ to a stationary part. The other arm $l$ of this lever carries a roll and is struck aside toward the left by a cam $n$, mounted on a rotating shaft $m$. The ordinary plan here would be to employ a stuffing-box at the place where the piston leaves the chamber $e$ to prevent escape of gas. As is well known, however, even the best packing material is not absolutely gas-tight, requires to be frequently renewed, and, moreover, gives rise to friction. According to the present invention a stuffing-box is entirely dispensed with and in its place a flexible tube $c$ is employed. One end of this tube is bolted, with the interposition of packing material, to the stationary part $b$, while the other end is similarly bolted to the movable machine part $a$, whereby an absolutely gas-tight tubular chamber is created, into which the gas can enter without being able to escape. In the example shown another advantage is secured by the employment of the flexible tube, inasmuch as the latter, in consequence of its constant endeavor to attain a perpendicular position, tends to turn the lever $a$ to the left, and thus obviates the employment of a special spring for the purpose.

The flexible tube may be constructed of any suitable material and is applicable to the greatest variety of cases in addition to the particular one described by way of example.

Having thus fully described my invention, what I claim as new, and desire to secure by Letters Patent, is—

1. In combination with a reciprocating part, a part laterally arranged in respect thereto and connected thereto to move therewith and a tube having longitudinal and lateral flexion forming a closed space between said moving parts, substantially as described.

2. In combination, the piston $f$, a lever $a$, pivotally supported, an arm $i$ connecting the same with the piston and a flexible tube inclosing the piston-rod and the arm $i$ and having lateral flexion under the movement of the parts, substantially as described.

3. In combination, the vertically-reciprocating piston $f$, the lever $a$ pivoted at one side of the piston and having a laterally-extending arm $i$ connected with the piston and a curved flexible tube inclosing the piston-rod and arm and having vertical flexion under the movement of the parts.

In witness whereof I have hereunto set my hand in presence of two witnesses.

FRITZ REICHENBACH.

Witnesses:
 GUSTAV TOUBE,
 WOLDEMAR HAUPT.